United States Patent
McCombe et al.

(10) Patent No.: US 11,501,406 B2
(45) Date of Patent: Nov. 15, 2022

(54) DISPARITY CACHE

(71) Applicant: MINE ONE GmbH, Berlin (DE)

(72) Inventors: James A. McCombe, San Francisco, CA (US); Christoph Birkhold, San Francisco, CA (US)

(73) Assignee: MINE ONE GMBH, Berlin (DE)

( * ) Notice: Subject to any disclaimer, the term of this patent is extended or adjusted under 35 U.S.C. 154(b) by 0 days.

(21) Appl. No.: 16/769,539

(22) PCT Filed: Dec. 5, 2018

(86) PCT No.: PCT/US2018/064077
§ 371 (c)(1),
(2) Date: Jun. 3, 2020

(87) PCT Pub. No.: WO2019/113215
PCT Pub. Date: Jun. 13, 2019

(65) Prior Publication Data
US 2021/0217132 A1 Jul. 15, 2021

Related U.S. Application Data

(63) Continuation-in-part of application No. PCT/US2016/023433, filed on Mar. 21, 2016, and a continuation-in-part of application No. 16/749,989, filed on Jan. 22, 2020, now Pat. No. 11,106,275, which is a continuation of application No.
(Continued)

(51) Int. Cl.
*H04N 13/106* (2018.01)
*H04N 13/271* (2018.01)
*G06T 1/60* (2006.01)
*G06F 16/535* (2019.01)
*G06T 11/00* (2006.01)
*G06T 1/20* (2006.01)
*H04N 13/00* (2018.01)

(52) U.S. Cl.
CPC .............. *G06T 1/60* (2013.01); *G06F 16/535* (2019.01); *G06T 1/20* (2013.01); *G06T 11/005* (2013.01); *H04N 13/271* (2018.05); *G09G 2360/121* (2013.01); *H04N 13/106* (2018.05); *H04N 2013/0081* (2013.01)

(58) Field of Classification Search
None
See application file for complete search history.

(56) References Cited

U.S. PATENT DOCUMENTS 5,991,464 A 11/1999 Hsu
9,332,285 B1 * 5/2016 Grant ............... H04N 21/47205
(Continued)

OTHER PUBLICATIONS

Avci et al., "Efficient Disparity Vector Prediction Schemes . . . ", Jrnl. of Visual Communication and Image Representation, Academic Press vol. 23, No. 2, Oct. 27, 2011, pp. 287-292.
(Continued)

*Primary Examiner* — Joni Hsu
(74) *Attorney, Agent, or Firm* — Jacobs & Kim LLP; David Jacobs

(57) ABSTRACT

Methods, devices, systems and computer software/program code products improve the reliability of scene reconstruction through the use of a persistent store or cache to retain scene information observed across one or more previous frames.

19 Claims, 11 Drawing Sheets

Related U.S. Application Data

15/560,019, filed as application No. PCT/US2016/023433 on Mar. 21, 2016, now Pat. No. 10,551,913.

(60) Provisional application No. 62/595,055, filed on Dec. 5, 2017, provisional application No. 62/136,494, filed on Mar. 21, 2015.

(56) References Cited

U.S. PATENT DOCUMENTS

| | | |
|---|---|---|
| 2006/0083421 A1 | 4/2006 | Weiguo |
| 2006/0193179 A1 | 8/2006 | England |
| 2008/0077596 A1 | 3/2008 | Patton |
| 2011/0064299 A1 | 3/2011 | Zhang |
| 2011/0075025 A1 | 3/2011 | Cho |
| 2013/0077880 A1* | 3/2013 | Venkataraman ..... H04N 13/178 382/232 |
| 2013/0169764 A1* | 7/2013 | Lu ..................... G09G 3/003 348/51 |
| 2014/0038708 A1* | 2/2014 | Davison ............. A63F 13/5255 463/31 |
| 2014/0071313 A1 | 3/2014 | Hiasa |
| 2014/0267243 A1* | 9/2014 | Venkataraman ..... H04N 13/106 345/419 |
| 2015/0098645 A1 | 4/2015 | Leung |
| 2015/0229901 A1 | 8/2015 | Doba et al. |
| 2015/0302592 A1* | 10/2015 | Bruls ..................... G06T 7/50 348/44 |
| 2016/0203579 A1 | 7/2016 | Griffin |

OTHER PUBLICATIONS

Tsung et al., "Cache-Based Integer Motion/Disparity Estimation . . . ", 2009 IEEE Conf. on Acoustics, Speed and Signal Processing, Apr. 19, 2009, pp. 2013-2016.

* cited by examiner

600: DETERMINING CORRESPONDENCE:

601. SELECT A FEATURE IN A FIRST FRAME, THE FIRST FRAME REPRESENTING THE SCENE FROM A FIRST VIEWPOINT

602. FOR THE SELECTED FEATURE:

602.1 IDENTIFY A SUITABLE CACHE ENTRY ASSOCIATED WITH THE SELECTED FEATURE, THE IDENTIFYING COMPRISING: QUERYING A CACHE STRUCTURE CONTAINING CACHE ENTRIES, TO IDENTIFY THE SUITABLE CACHE ENTRY;

602.2 IN THE ABSENCE OF A SUITABLE CACHE ENTRY, SEARCH FOR A CORRESPONDING FEATURE, IN A SECOND FRAME, REPRESENTING THE SCENE FROM A SECOND VIEWPOINT, AND CREATE, BASED ON A RESULT OF THE SEARCH, AN ENTRY IN A CACHE STRUCTURE TO STORE THE RESPECTIVE CORRESPONDENCE.

FIG. 6

700. ADDITIONAL/OPTIONAL ELEMENTS RELATING TO DETERMINING CORRESPONDENCE:

(701. THE FEATURE COMPRISES A KERNEL OF PIXEL VALUES)

(702. THE KERNEL OF PIXEL VALUES COMPRISES A CHROMA COMPONENT)

(703. THE IDENTIFYING COMPRISES: EXECUTING A COMPARISON BETWEEN PIXEL VALUES)

(704. THE IDENTIFYING COMPRISES: COMPARING THE NUMBER OF PRIOR SUCCESSFUL MATCHES OF PIXEL VALUES)

(705. THE IDENTIFYING COMPRISES ACCESSING ENTRIES BASED ON TWO-DIMENSIONAL IMAGE-SPACE COORDINATES)

(706. THE CACHE STRUCTURE COMPRISES A FIXED MATRIX OF POSSIBLE ENTRIES; AND WHEREIN TWO DIMENSIONS OF THE MATRIX HAVE A SIZE PROPORTIONAL TO THE PIXEL RESOLUTION OF THE FIRST FRAME.)

(707. CONSTRUCT A THIRD FRAME REPRESENTING THE SCENE FROM A THIRD VIEWPOINT)

FIG. 7

800: NON-CORRESPONDENCE-BASED RECONSTRUCTION OF IMAGE:

801. RECEIVE AN INPUT FROM AT LEAST ONE CAMERA HAVING A VIEW OF THE SCENE AND OPERABLE TO CAPTURE AN IMAGE OF THE SCENE, THE INPUT COMPRISING PIXEL VALUES REPRESENTATIVE OF THE SCENE

802. QUERY A CACHE STRUCTURE CONTAINING CACHE ENTRIES ASSOCIATED WITH THE PIXEL VALUES, TO OBTAIN SUITABLE ENTRIES TO ENABLE EXECUTION, IN THE DIGITAL PROCESSING RESOURCE, OF A SELECTED METHOD OF NON-CORRESPONDENCE-BASED IMAGE RECONSTRUCTION, WHEREIN THE SELECTED METHOD OF NON-CORRESPONDENCE-BASED IMAGE RECONSTRUCTION COMPRISES ACTIVE DEPTH SENSING, UTILIZING DEPTH INFORMATION PROVIDED BY THE CAMERA HAVING A VIEW OF THE SCENE.

FIG. 8

900: PRODUCING RICH FRAME INFORMATION:

901. RECEIVE, FROM EACH OF AT LEAST TWO CAMERAS, EACH CAMERA HAVING A VIEW OF A SCENE, A RESPECTIVE INDEPENDENT VIEWPOINT OF THE SCENE, EACH VIEWPOINT HAVING PIXELS ASSOCIATED THEREWITH

902. STORE, IN A FRAME BUFFER MEMORY, PIXELS CAPTURED BY THE CAMERAS

903. STORE, IN SCENE CACHE MEMORY, SCENE INFORMATION THAT PERSISTS ACROSS A PLURALITY OF FRAMES

904. USE MULTI-VIEW CORRESPONDENCE LOGIC, THE LOGIC COMPRISING ELECTRONIC AND/OR SOFTWARE ELEMENTS, TO:

904.1 SELECT AN IMAGE SUBSET FROM FRAME BUFFER MEMORY;

904.2 QUERY THE SCENE CACHE MEMORY;

904.3 EVALUATE THE SUITABILITY OF AN ENTRY FROM THE SCENE CACHE MEMORY; AND 904.4 UPDATE ONE OR MORE ENTRIES IN THE SCENE CACHE MEMORY.

FIG. 9

1000. OPTIONAL ASPECTS RELATING TO RICH FRAME INFORMATION (1001. THE MULTI-VIEW CORRESPONDENCE LOGIC COMPRISES DIGITAL PROCESSOR-READABLE PROGRAM CODE EXECUTABLE ON A GENERAL-PURPOSE COMPUTATIONAL DEVICE)

(1002. THE MULTI-VIEW CORRESPONDENCE LOGIC COMPRISES DIGITAL PROCESSOR-READABLE PROGRAM CODE EXECUTABLE ON A PROGRAMMABLE GPU)

(1003. THE RICH FRAME INFORMATION COMPRISES A DEPTH MAP)

FIG. 10

DISPARITY CACHE

CROSS-REFERENCE TO RELATED APPLICATIONS, INCORPORATION BY REFERENCE

This patent application claims the priority benefit of commonly owned U.S. Provisional Pat. App. 62/595,055 filed Dec. 5, 2017, entitled "Disparity Cache"; and is a continuation-in-part of commonly owned, co-pending PCT patent application PCT/US16/23433 entitled "Virtual 3D Methods, Systems And Software", published as WO/2016/154123, which claims the priority benefit of U.S. Provisional Pat. App. 62/136,494 filed Mar. 21, 2015.

This patent application is also related to commonly owned, co-pending PCT Pat. App. PCT/US16/32213 entitled "Facial Signature Methods, Systems and Software", published as WO/2016/183380, which claims the priority benefit of U.S. Provisional App. 62/160,563.

This patent application is also related to commonly owned, co-pending PCT Pat. App. PCT/US18/19243 entitled "Image Reconstruction for Virtual 3D", published as WO/2018/164852, which claims the priority benefit of U.S. Provisional App. 62/462,307.

This patent application is also related to commonly owned, co-pending PCT Pat. App. PCT/US18/63699, entitled "Stereo Correspondence Search", which claims the priority benefit of U.S. Provisional App. 62/594,006.

This patent application is also related to commonly owned, co-pending PCT Pat. App. PCT/US18/48197, entitled "Visual Communications Methods, Systems And Software", which claims the priority benefit of U.S. Provisional App. 62/550,685.

This patent application is also related to commonly owned, co-pending PCT Pat. App. PCT/US18/63531 entitled "Temporal De-Noising", which claims the priority benefit of U.S. Provisional App. 62/593,920.

Each of the above-listed patent applications is incorporated by reference herein as if set forth herein in its entirety, including all text and drawings thereof.

BACKGROUND OF THE INVENTION

It would be desirable to provide methods, systems, devices and computer software/program code products that improve the reliability of scene reconstruction in digital image processing.

It would also be desirable to provide such benefits at reasonable computational cost.

The present invention provides methods, systems, devices and computer software/program code products that enable the foregoing aspects and others.

Although embodiments and practices of the present invention discussed herein can be used in conjunction with practices and embodiments of the Virtual 3-D ("V3D") inventions described in the above-noted, commonly-owned patent applications incorporated herein by reference, they may also be useful in other systems and in connection with other technologies, and are not limited to application in connection with the V3D inventions described in the patent applications incorporated by reference herein.

Aspects, examples, embodiments and practices of the invention, whether in the form of methods, devices, systems or computer software/program code products, will next be described in greater detail in the following Detailed Description of the Invention, in conjunction with the attached drawing figures.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

SUMMARY OF THE INVENTION

One aspect of the present invention relates to methods, systems, devices and computer software/program products for determining correspondence between two viewpoints of a common scene, wherein the determining comprises:

in a digital processing resource comprising at least one digital processor:

A. selecting a feature in a first frame, the first frame representing the scene from a first viewpoint; and B. for the selected feature:

(1) identifying a suitable cache entry associated with the selected feature, the identifying comprising: querying a cache structure containing cache entries, to identify the suitable cache entry;

(2) in the absence of a suitable cache entry, searching for a corresponding feature, in a second frame, representing the scene from a second viewpoint, and creating, based on a result of the search, an entry in a cache structure to store the respective correspondence.

In another aspect, the feature comprises a kernel of pixel values.

In another aspect, the kernel of pixel values comprises a chroma component.

In another aspect, the identifying comprises: executing a comparison between pixel values.

In another aspect, the identifying further comprises: comparing the number of prior successful matches of pixel values In another aspect, the identifying comprises accessing entries based on two-dimensional image-space coordinates.

In another aspect, the cache structure comprises a fixed matrix of possible entries; and two dimensions of the matrix have a size proportional to the pixel resolution of the first frame.

Another aspect comprises: constructing a third frame representing the scene from a third viewpoint.

Another aspect of the present invention relates to methods, systems, devices and computer software/program products for producing rich frame information representative of a scene, wherein the system aspects comprise:

at least two cameras, each having a view of a scene, each camera operable to capture an independent viewpoint of a scene, the viewpoint having pixels associated therewith;

frame buffer memory, operable to store pixels captured by the cameras;

scene cache memory, operable to retain scene information that persists across a plurality of frames; and multi-view correspondence logic, the logic comprising electronic and/or computer software elements that constitute:

logic to select an image subset from frame buffer memory;

logic to query the scene cache memory;

logic to evaluate the suitability of an entry from the scene cache memory; and logic to update one or more entries in the scene cache memory.

In another aspect, the multi-view correspondence logic comprises digital processor-readable program code executable on a general-purpose computational device In another aspect, the multi-view correspondence logic comprises digital processor-readable program code executable on a programmable GPU.

In another aspect, the rich frame information comprises a depth map.

Another aspect of the invention relates to a digital processor-executed method for non-correspondence-based reconstruction of an image of a scene, based on an input of pixel values representative of an image of the scene captured by a camera having a view of the scene, the method comprising:

in a digital processing resource comprising at least one digital processor:

A. receiving an input from at least one camera having a view of the scene and operable to capture an image of the scene, the input comprising pixel values representative of the scene; and B. querying a cache structure containing cache entries associated with the pixel values, to obtain suitable entries to enable execution, in the digital processing resource, of a selected method of non-correspondence-based image reconstruction, wherein the selected method of non-correspondence-based image reconstruction comprises active depth sensing, utilizing depth information provided by the camera having a view of the scene.

Another aspect of the invention relates to a system for determining correspondence between two viewpoints of a common scene, the system comprising:

a digital processing resource comprising at least one digital processor, the digital processing resource being operable to:

A. select a feature in a first frame, the first frame representing the scene from a first viewpoint; and B. for the selected feature:
  (1) identify a suitable cache entry associated with the selected feature, the identifying comprising: querying a cache structure containing cache entries, to identify the suitable cache entry;
  (2) in the absence of a suitable cache entry, search for a corresponding feature, in a second frame, representing the scene from a second viewpoint, and create, based on a result of the search, an entry in a cache structure to store the respective correspondence.

Another aspect of the invention relates to a program product for use with a digital processing system to enable the digital processing system to determine correspondence between two viewpoints of a common scene, the digital processing system comprising at least one digital processor, the program product comprising digital processor-executable program instructions stored on a non-transitory digital processor-readable medium, which when executed in the digital processing system cause the digital processing system to:

A. select a feature in a first frame, the first frame representing the scene from a first viewpoint; and B. for the selected feature:
  (1) identify a suitable cache entry associated with the selected feature, the identifying comprising: querying a cache structure containing cache entries, to identify the suitable cache entry;
  (2) in the absence of a suitable cache entry, search for a corresponding feature, in a second frame, representing the scene from a second viewpoint, and create, based on a result of the search, an entry in a cache structure to store the respective correspondence.

Another aspect of the invention relates to a method for producing rich frame information representative of a scene, the method comprising:

receiving, from each of at least two cameras, each camera having a view of a scene, a respective independent viewpoint of the scene, each viewpoint having pixels associated therewith;

storing, in a frame buffer memory, pixels captured by the cameras;

storing, in scene cache memory, scene information that persists across a plurality of frames; and utilizing multi-view correspondence logic, the logic comprising electronic and/or computer software elements, to:
  (1) select an image subset from frame buffer memory;
  (2) query the scene cache memory;
  (3) evaluate the suitability of an entry from the scene cache memory; and
  (4) update one or more entries in the scene cache memory.

Another aspect of the invention relates to a program product for use with a digital processing system for enabling the digital processing system to produce rich frame information representative of a scene, the digital processing system comprising at least one digital processor, the program product comprising digital processor-executable program instructions stored on a non-transitory digital processor-readable medium, which when executed in the digital processing system cause the digital processing system to:

receive, from each of at least two cameras, each camera having a view of a scene, a respective independent viewpoint of the scene, each viewpoint having pixels associated therewith;

store, in a frame buffer memory, pixels captured by the cameras;

store, in scene cache memory, scene information that persists across a plurality of frames; and utilize multi-view correspondence logic, the logic comprising electronic and/or computer software elements, to:
  (1) select an image subset from frame buffer memory;
  (2) query the scene cache memory;
  (3) evaluate the suitability of an entry from the scene cache memory; and
  (4) update one or more entries in the scene cache memory.

Another aspect of the invention relates to a digital system for executing non-correspondence-based reconstruction of an image of a scene, based on an input of pixel values representative of an image of the scene captured by a camera having a view of the scene, the system comprising:

a digital processing resource comprising at least one digital processor, the digital processing resource being operable to:

A. receive an input from at least one camera having a view of the scene and operable to capture an image of the scene, the input comprising pixel values representative of the scene; and B. query a cache structure containing cache entries associated with the pixel values, to obtain suitable entries to enable execution, in the digital processing resource, of a selected method of non-correspondence-based image reconstruction, wherein the selected method of non-correspondence-based image reconstruction comprises active depth sensing, utilizing depth information provided by the camera having a view of the scene.

Another aspect of the invention relates to a program product for use with a digital processing system, for enabling the digital processing system to execute non-correspondence-based reconstruction of an image of a scene, based on an input of pixel values representative of an image of the scene captured by a camera having a view of the scene, the digital processing system comprising at least one digital processor, the program product comprising digital processor-executable program instructions stored on a non-transitory digital processor-readable medium, which when executed in the digital processing system cause the digital processing system to:

A. receive an input from at least one camera having a view of the scene and operable to capture an image of the scene, the input comprising pixel values representative of the scene; and B. query a cache structure containing cache entries associated with the pixel values, to obtain suitable entries to enable execution, in the digital processing system, of a selected method of non-correspondence-based image reconstruction, wherein the selected method of non-correspondence-based image reconstruction comprises active depth sensing, utilizing depth information provided by the camera having a view of the scene.

These and other aspects, examples, embodiments and practices of the invention, whether in the form of methods, devices, systems or computer software/program code products, will be discussed in greater detail below in the following Detailed Description of the Invention and in connection with the attached drawing figures.

In the aspects of the invention described herein, the image processing methods described are executable by digital processors, which can include graphics processor units (GPUs), including general purpose graphics processor units (GPGPUs) such as those commercially available on cellphones, smartphones, tablets and other commercially available telecommunications and computing devices, as well as in digital display devices and digital cameras. Those skilled in the art to which this invention pertains will understand the structure and operation of digital processors, GPGPUs and similar digital graphics processor units.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIGS. 6-10 are flowcharts depicting exemplary practices of the invention.

DETAILED DESCRIPTION OF THE INVENTION

Overview

This document describes an invention, and methods, devices, systems and computer software/program code products in accordance with the invention, which improves the reliability of scene reconstruction through the use of a persistent store to retain scene information observed across one or more previous frames. The invention is applicable, among other areas of technology, to computer- or digital-processor-based image processing. The invention may be applicable to other areas of technology as well, and no limitation of applicability is asserted or implied hereby.

Exemplary embodiments and practices of the present invention utilize a persistent store or cache structure that may be queried using observed scene features, including image kernels from captured frames, in order to augment data observed by cameras or other sensors. The cache, in addition to the captured sensor data, provides a more complete source of scene information than the sensors could provide alone. In addition, exemplary practices and embodiments of the invention enable accurate disparity and depth to be calculated or retrieved for portions of a scene that are otherwise invisible or not sufficiently visible to the required sensors.

In addition, the invention may be used to reduce the requirements for computationally costly stereo correspondence search operations that may otherwise be required by a multi-camera device. For examples of applications in which the present invention may be useful, see the Applicants' commonly-owned patent applications listed above and incorporated herein by reference.

Introduction

Multi-perspective correspondence algorithms, such as stereo correspondence search, rely on identifying features within an observed scene that are common among two or more viewpoints. In many instances this is accomplished by matching subsets of the images, or image kernels, from a first camera perspective, with subsets of the images from a second camera perspective. Results where the match is the most similar indicate a high likelihood that the kernels represent the same feature of a scene, viewed from different camera perspectives.

Multi-perspective correspondence for a given feature is impossible when that feature of the scene is invisible to all but one camera.

Figure 1:
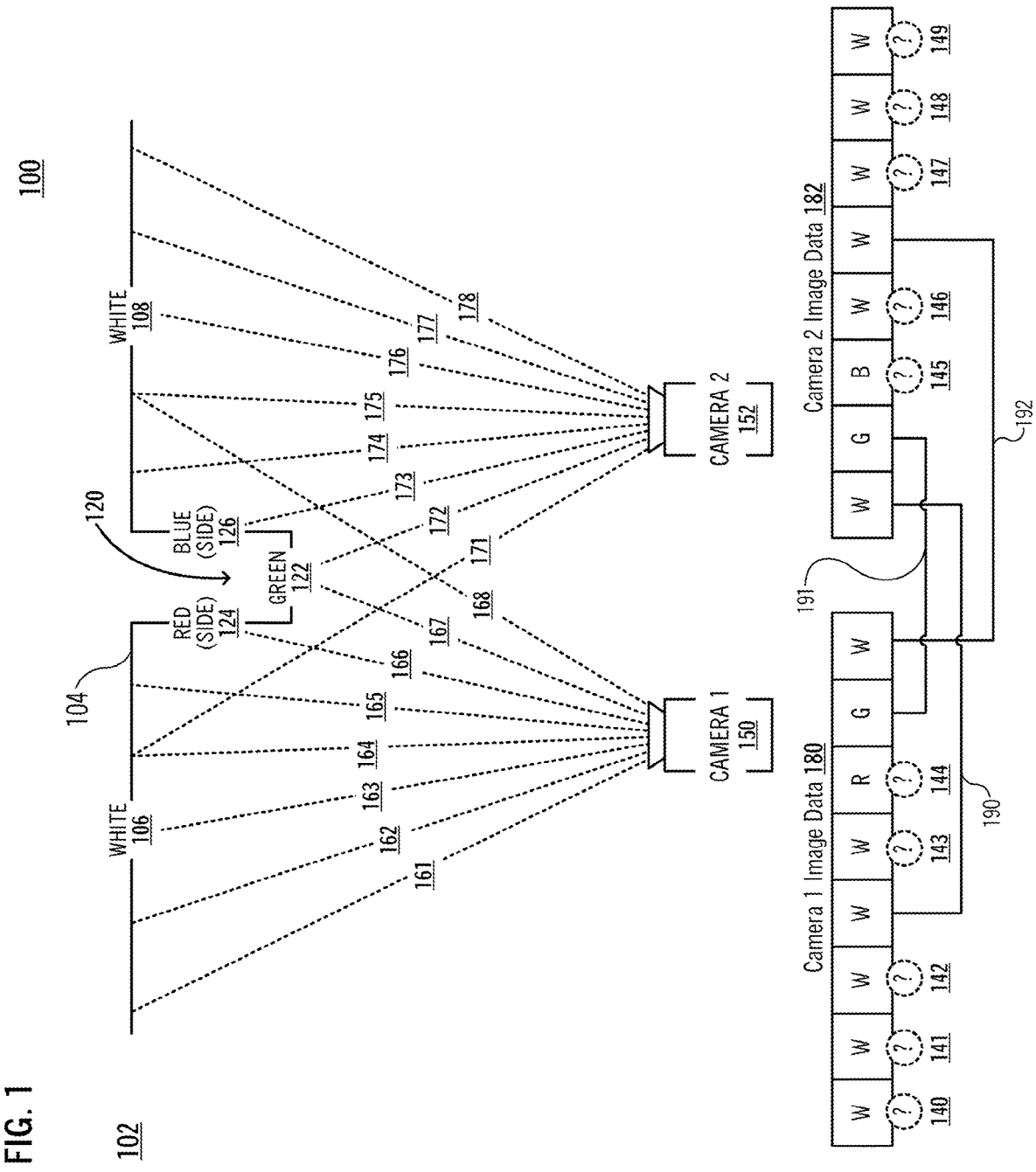
FIG. 1 is a schematic block diagram depicting stereo correspondence between two camera perspectives, illustrating areas of corresponding subsets of an image observed by first and second cameras, and also illustration portions of the image for which correspondence does not exist.

By way of example, the schematic diagram of FIG. 1 depicts stereo correspondence between two camera perspectives, illustrating areas of corresponding subsets of the image, and also portions of the image for which correspondence does not exist.

In particular, FIG. 1 depicts an exemplary configuration 100 comprising sensors, in this case, Camera 1 (150) and Camera 2 (152) that collect data, in this case, image data, from a scene 102 that comprises a surface or object 104. For purposes of this example, the surface 104 has sections 106 and 108 that are white, a projecting portion 120 that has a green facing portion 122, a red side 124 and a blue side 126. Also shown in FIG. 1 are eight exemplary rays 161-168 that trace back to Camera 1 (150) and eight exemplary rays 171-178 that trace back to Camera 2 (152).

Image data collected by Camera 1 about the surface and corresponding to rays 161-168 are stored in an exemplary table 180 with eight entries, each corresponding to a value captured by Camera 1, and each corresponding to a respective ray of rays 161-168 shown in FIG. 1. As shown in FIG. 1, in table 180, a value "W" corresponds to the color white; a value "R" corresponds to the color red; and a value G corresponds with a color green. Accordingly, in the example shown in FIG. 1, table 180, which contains Camera 1 image data, has the eight values W-W-W-W-W-R-G-W. Each respective value therein corresponds to a respective ray 161-168 and a respective ray intersection with the surface 104.

Similarly, image data collected by Camera 2 about the surface and corresponding to rays 171-178 are stored in an exemplary table 182 with eight entries, each corresponding to a value captured by Camera 2, and each corresponding to a respective ray of rays 171-178 shown in FIG. 1. Table 182, which contains Camera 2 image data, has the eight values W-G-B-W-W-W-W-W.

As also shown in the example of FIG. 1, correlation lines 190, 191 and 192 depict stereo correspondence between corresponding subsets of the image (for example, W to W for 190, G to G for 191, and W to W for 192, while the ten question mark symbols ("?") (140-149) associated with some of the values of Camera 1 image data and Camera 2 image data, respectively, denote portions of the image for which correspondence does not exist.

Additionally, some systems and methods, such as those described in the Applicants' commonly-owned patent applications listed above and incorporated herein by reference, can produce a result with higher confidence if the feature is visible to more than two cameras. When a feature is occluded from the perspective of one or more cameras or camera perspectives, the result becomes less reliable.

In addition, it may be impossible to know the content of portions of an observed scene that are occluded from all camera perspectives. A faithful reconstruction of the scene may be impossible without such information.

An image processing system, device, or application wishing to reconstruct the view from a scene perspective exposing the missing information would need to synthesize or "hallucinate" the colors for the pixels displaying the disoccluded portion of the scene.

Similarly, current multi-perspective correspondence algorithms may synthesize information about a pixel or subset of the image. A common approach is to assume values for a pixel, based on nearby pixels values, using interpolation or extrapolation. For example, a stereo correspondence algorithm that is being used to derive stereo disparity for a camera pair in order to compute a depth value for each pixel, may need to assume that a pixel visible to only one camera may share the same disparity, and therefore depth, with the nearest pixel that is visible to both cameras.

Solutions based on two-dimensional (2-D) proximity in image-space often work acceptably well, but can fail with dramatic visible artifacts, especially for pixels or subsets of an image near large and abrupt changes in depth.

In addition, methods for determining stereo correspondence may be computationally costly or may require large amounts of memory bandwidth. Often these algorithms involve searching through large numbers of potential matches to determine the best possible correlation or result.

Overview of Practices and Embodiments of Invention

The present invention utilizes a persistent store of image kernels and associated data, to retain information about the scene that may be occluded from a current camera perspective or perspectives. This data store may be referred to as a cache, and may have some cache-like properties. This document from time to time refers to "the cache", which may imply a singular object, but the invention can also be practiced, embodied or implemented with multiple caches or data stores, or with distributed cache architectures.

There are at least two distinct benefits to the use of a use of the cache or data store in accordance with the present invention. First, the data store allows scene information to persist from frame to frame. This means that information persists when moving objects occlude or partially occlude a portion of the scene that was previously visible. This leads to improved quality in the output data, in the form of multi-perspective correspondence maps or disparity maps.

Figure 2:
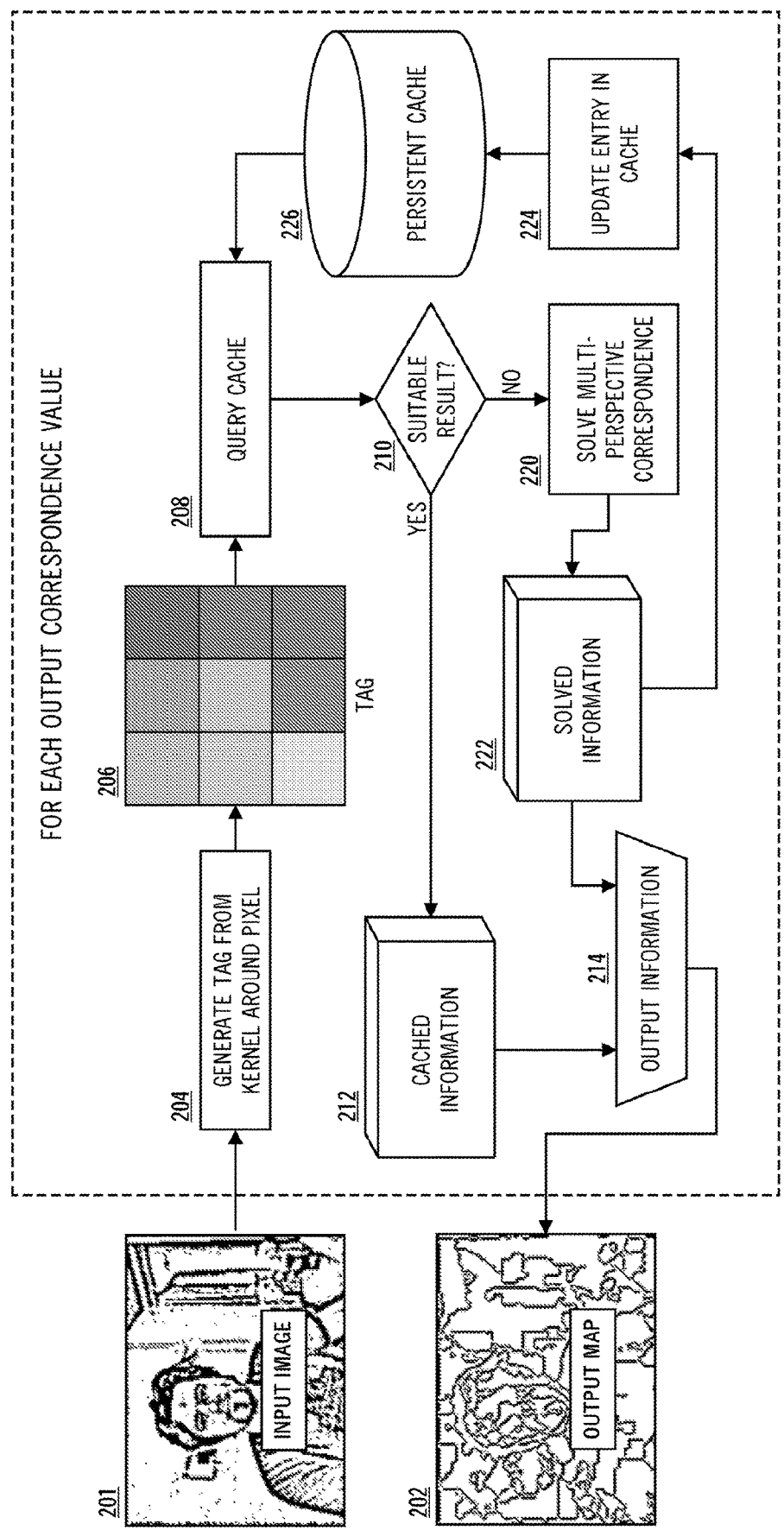
FIG. 2 is a schematic block diagram depicting an exemplary pipeline, in accordance with the present invention, in which a persistent cache is used to augment the result of stereo disparity searches or multi-perspective correspondence operations in the production of a multi-perspective correspondence map or disparity map ("Output Map").

By way of example, FIG. 2 depicts an exemplary pipeline, in accordance with the present invention, in which a persistent cache is used to augment the result of some stereo disparity searches or multi-perspective correspondence operations in the production of a multi-perspective correspondence map or disparity map.

The pipeline 200 of FIG. 2 has, as an input, the Input Image 201, and has, as an input, the Output Map 202. In the example shown in FIG. 2, a set of operations is executed for each output correspondence value. In particular, based on the input image 201, tags are generated (element, function or operation 204: "generate tag from kernel around pixel") from a kernel around a pixel from the Input Image 201. Tags can be stored in a table or other storage configuration 206, and can then be an input to a Query Cache element, function or operation 208. The output of query cache 208 is then an input to a test operation: "suitable result?" 210. If the answer is "Yes" then the result is sent to element, function or operation 212, Cached Information, and the output of element 212 can be transmitted to an Output Information element, function or operation 214, and then transmitted to or used in the Output Map 202.

If the answer to the "Suitable Result?" test 210 is "No", then the output of 210 is sent to element, function or operation 220, "Solve Multi-Perspective Correspondence." The output of 220 is then passed to element 222, "Solved Information", from which it is then passed to Output Information 214, and it is also fed back to element, function or operation 224, "Update Entry in Cache", which causes update to Persistent Cache 226; and an output from Persistent Cache 226 can be used as an input to Query Cache 208.

A second benefit of the use of the cache or data store in accordance with the invention is due to a reduced computational cost and concomitant power savings. Multi-perspective search operations can be costly to execute, in both computation and memory bandwidth terms. When data is available from the cache, they system may avoid the need to perform a multi-perspective solution, or may bound the search operation to reduce the computational cost.

In some embodiments, the savings from avoiding some correspondence search operations can be applied to performing more thorough searches in the particular cases in which such searching is required. For example, a search operation may be limited in the distance that can be searched, or limited in the number of comparisons that can be performed, in order to limit computation cost. The need to perform fewer search operations may translate into the ability to search a greater range and/or evaluate more possible matches, ultimately leading to a higher quality result.

In accordance with the invention, the data store may be a simple electronic structure, such as a regular structure containing a fixed number of entries for each camera pixel. It may also be a dynamic structure with complex query logic. In accordance with the invention, the query operation is operable to retrieve the most suitable entry from the data store, based on defined suitability criteria such as the evaluation of a matching function between the cache entry and a query structure, also known as a "tag," often comprising an image kernel. In some instances the data store will not contain a sufficiently suitable entry, in which case no result is returned.

If a sufficiently suitable entry does exist in the data store, the entry may be used to augment or replace a stereo disparity calculation or search operation. An entry may contain additional data as well. Examples of the types of data stored with an entry include: disparity values, depth values, positions in three-dimensional (3D) space, color or visibility information, confidence metrics, or other data.

If a stereo correspondence search or stereo disparity calculation is performed, the results of the search may be used to create additional entries in the data store or cache. Alternatively, the results may be used to update an existing entry, either to improve the quality of the data in the entry or to "strengthen" the entry to indicate a higher degree of reliability for the data contained by the entry.

A data store with entries containing camera disparity values may be referred to herein, in accordance with the present invention, as a Disparity Cache. The term "Disparity Cache" as used herein in accordance with the invention may be applied more generally to data stores that contain alternative information, and is not intended to limit the scope of the invention described herein.

Inter-Frame Data Persistence

Many factors and situations may contribute to unreliable data in a single given frame, but fortunately, and as utilized by the present invention, many of those factors will not necessarily be present in past or future frames. One example is temporal noise in a captured image from a camera. A single frame may have disproportionately bad noise in a subset of the pixels, while a different subset may be affected in an alternate frame. Therefore, combining data from one frame or set of frames with data from another frame or set of frames yields a higher quality result than a result based on one frame or one set of frames alone.

In another example, a source of problematic data is associated with moving objects within the scene. For example, a foreground object may occlude large portions of the scene behind it. In addition, the object may potentially degrade the quality of data available for portions of the scene that may be seen to fall within the silhouette of the object. If the data store had retained information pertaining to the portion of the scene behind and surrounding the occluding object from prior frames, that information could be made available to accurately reconstruct occluded and unreliable portions of the scene in the present instant. The present invention provides this benefit.

Figure 3:
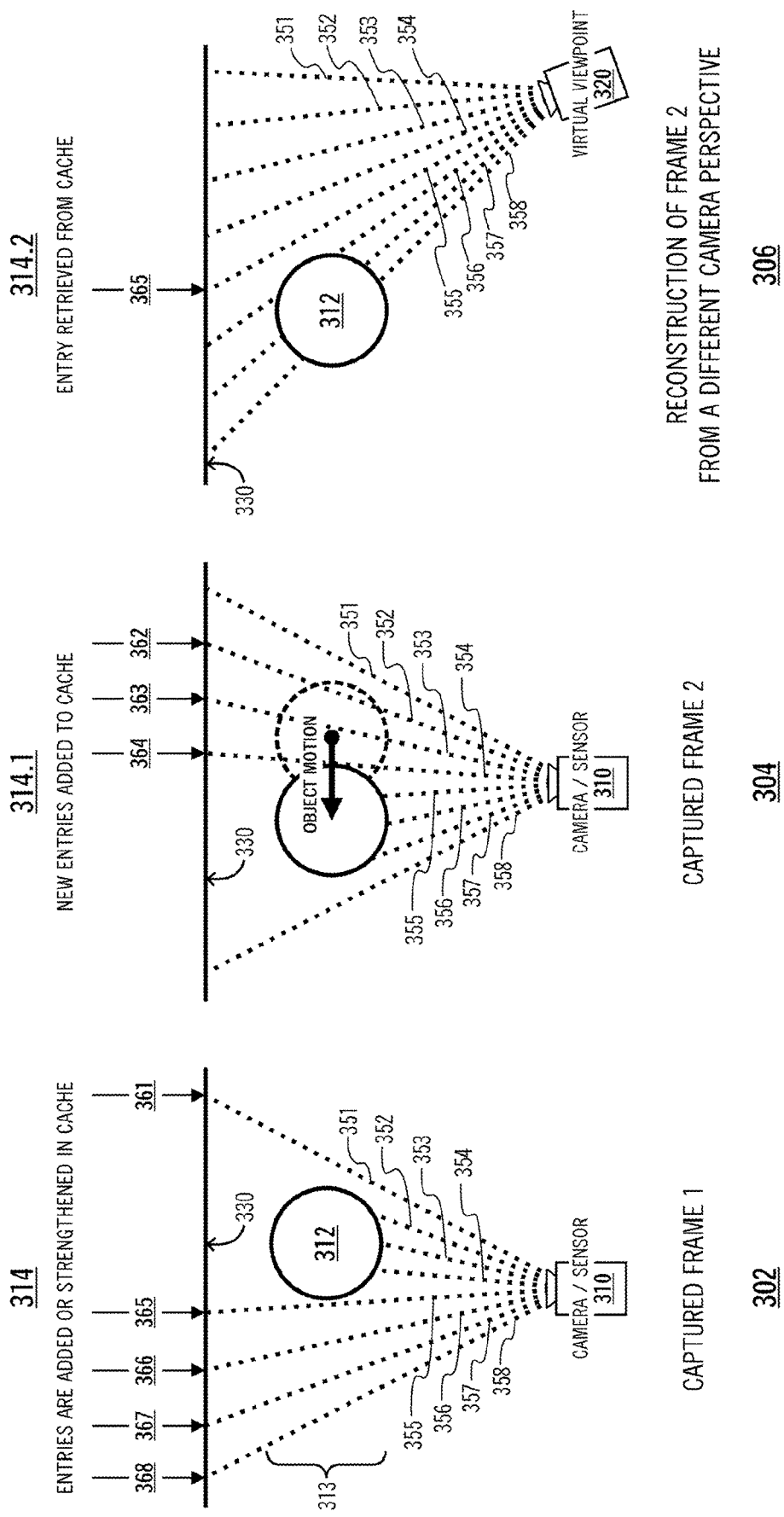
FIG. 3 is a schematic block diagram depicting an exemplary practice of the invention in which portions of a scene are captured by a sensor in a first frame, added to a store or cache, and retrieved when creating a reconstruction of a second frame from a virtual viewpoint.

By way of example, FIG. 3 depicts a scenario (including Captured Frame 1 (reference numeral 302), Captured Frame 2 (reference numeral 304) and Reconstruction of Frame 2 from a selected different camera perspective (reference numeral 306)) in which portions of a scene are captured by a sensor in a first frame, added to a store or cache, and retrieved when creating a reconstruction of a second frame from a virtual viewpoint.

In particular, FIG. 3 shows a scene, object(s) and camera/sensor configuration (collectively, 314 in Frame 1) across the following image frames: Captured Frame 1 (302), Captured Frame 2 (304) and a Reconstruction of Frame 2 from a Different Camera Perspective (306). The collective configuration of scene, object(s) and camera/sensor is referred to as 314 in Frame 1, then 314.1 in Frame 2, and 314.2 in the Reconstructed Frame 2.

As shown in FIG. 3, in Captured Frame 1, the collective configuration 314 includes a camera or sensor 310, a circular object 312, and a surface (indicated by a line segment) 330. A set of eight exemplary rays (collectively 313) trace from either the surface 330 to the camera/sensor 310, or from the object 312 to the camera/sensor 310. In Captured Frame 1, of the eight exemplary rays individually numbered 351-358, rays 352, 353 and 354 trace from object 312 back to camera/sensor 310, and the other five rays 351, 355, 356, 357 and 358 trace from surface 330 back to camera/sensor 310.

As also shown in FIG. 3, during Captured. Frame 1, digital data entries are added or strengthened in the cache, in accordance with the present invention. In the example of Captured Frame 1, these are five entries 361, 365, 366, 367 and 368 (indicated by downward arrows touching surface line 330), shown as corresponding, respectively, to rays 351, 355, 356, 357 and 358.

Next, as shown in Captured. Frame 2, the circular object 312 has moved from its previous, Frame 1 position, to a new, more leftward position in Frame 2. The object has thus moved from right to left, as shown in Captured Frame 2 in FIG. 3 by a heavy arrow, originating from the center of the circular object as it was previously positioned (the previous position of the circular object being shown in dashed circular outline in Frame 2) and ending at the center of the circular object at its new position in Frame 2 (the circular object, at its new position, being indicated by a solid circular outline in Frame 2).

In Frame 2, given the new position of object 312, new entries 362, 363 and 364 can now be added to the cache, as those points on the surface 330 are now directly visible by the camera/sensor 310, illustrated by rays 352, 353 and 354.

Next, in Reconstructed Frame 2, reconstructed in accordance with the invention from a different—and virtual—camera perspective or viewpoint (primarily rotated from the viewpoint of physical camera 310 previously described), the virtual camera or sensor viewpoint is indicated by reference numeral 320. In this reconstructed view, rays 351-355 trace from surface 330 to the virtual camera or sensor 320, and rays 356, 357 and 358 trace from object 312 to the virtual camera or sensor 320. In reconstructing this view, a point on surface 330 corresponding to ray 355 is not available from Captured Frame 2 (304). Hence the data is supplemented with cache entry 365 retrieved in accordance with the invention.

Another source of problematic data may be regions of a scene with very abrupt changes in depth, as observed from a camera. In such a scene feature, there is often very little information available about the side or sides of the feature. For example, very little information is available about the texture of a fence from a viewpoint in which the fence recedes quickly into the distance due to its steep angle with respect to the camera's gaze vector. A prior camera viewpoint, in contrast, might allow considerably better visual information to be captured for the fence. The present invention enables such information to be retained to assist in reconstructing the fence, of the present example, or other object or scene feature, with superior fidelity.

The present invention can also benefit sensor technologies beyond or other than cameras. For example, a depth-sensing device such as a structured-light depth-sensor, time-of-flight depth-sensor, RADAR or LIDAR can be used in conjunction with the invention. In these embodiments, a small collection of depth values or 3-D point positions could be considered or utilized as part of a tag or query structure to access the data store of the invention.

Operation of Cache

Figure 4:
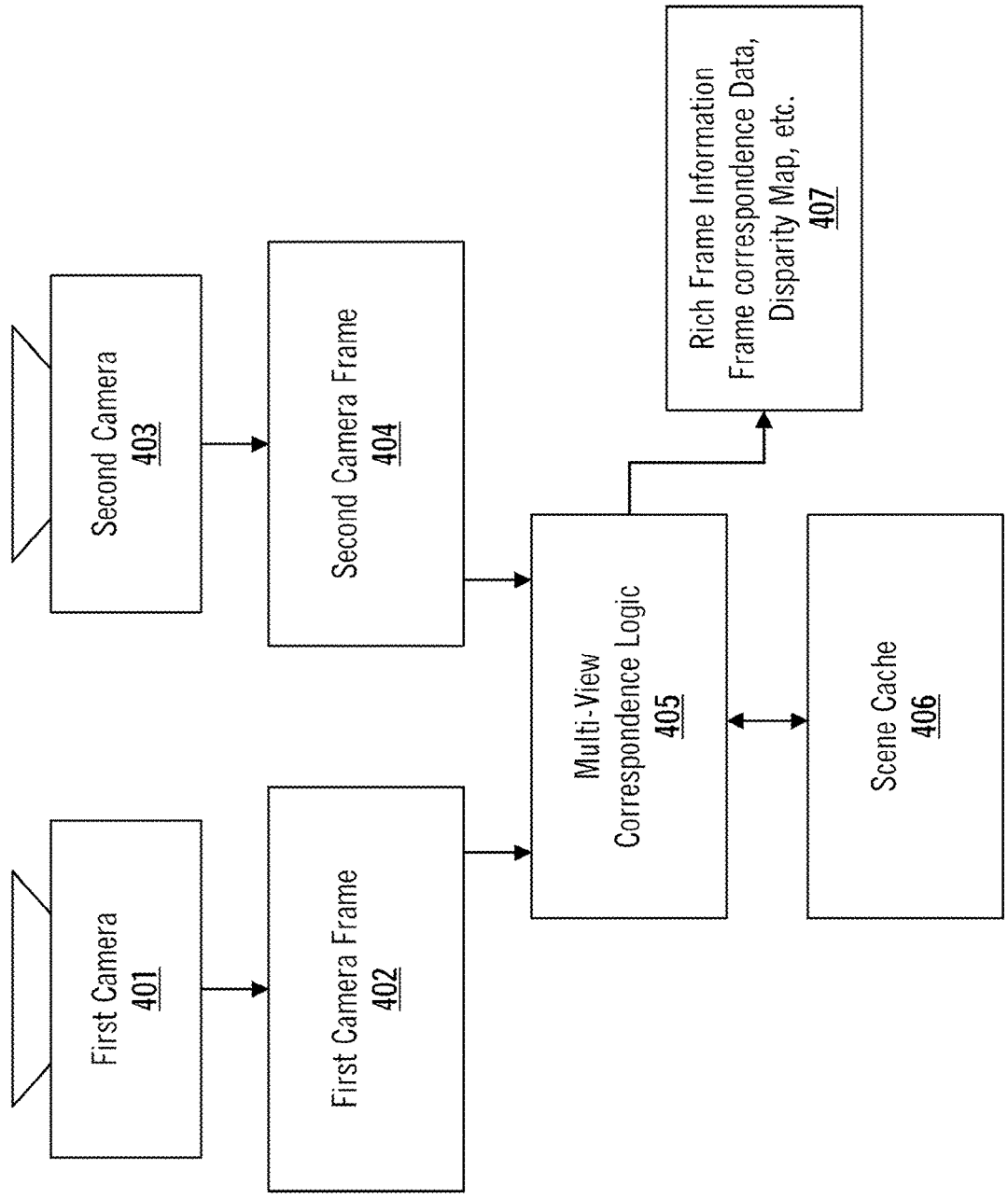
FIG. 4 is a schematic block diagram depicting an exemplary embodiment of the present invention, in the form of a system that utilizes a cache to produce rich frame information by evaluating multi-view correspondence logic that compares a first and a second frame, captured from a first camera and a second camera, respectively.

FIG. 4 depicts an exemplary embodiment of the present invention, in the form of a system that utilizes a cache to produce rich frame information by evaluating multi-view correspondence logic that compares a first and a second frame captured from a first camera and a second camera, respectively.

In the exemplary system of FIG. 4, frames 402 and 404 are produced from a first camera 401, and a second camera 403, respectively. These frames are made available to multi-view correspondence logic 405 to perform correspondence searching and produce rich frame information 407.

Multi-view correspondence logic 405 is operable to write information into scene cache 406, as well as to query the scene cache in the process of producing rich frame information 407. As frames are sequentially processed by the system, scene cache 406 will collect more information about the scene, allowing multi-view correspondence logic 405 to achieve better results with less computational cost.

In some embodiments, multi-view correspondence logic 405 is operable to select subsets of the first camera frame 402, to be treated as the "Input Frame", and compare those subsets against data in the second camera frame 404, to be treated as the "Target Frame". Subsequently, the multi-view correspondence logic 405 may be operable to alter its behavior, treating the first camera frame 402 as the target frame, and the second camera frame 404 as the input frame.

Although the exemplary system of FIG. 4 is presently described in terms of first and second cameras, by way of example, other practices and embodiments of the invention may use more than two camera perspectives. Alternatively, some embodiments may use only one camera and select input and target frames from the sequence of frames captured by the same camera.

In some embodiments, each input camera may make use of a segregated cache or cache space, whereby queries containing data from a given source are limited to retrieve cache entries containing data originating from the same source. In alternative embodiments, an un-segregated cache may be used, whereby query operations are operable to retrieve cache entries regardless of the original source of the data contain in the cache entry.

Figure 5:
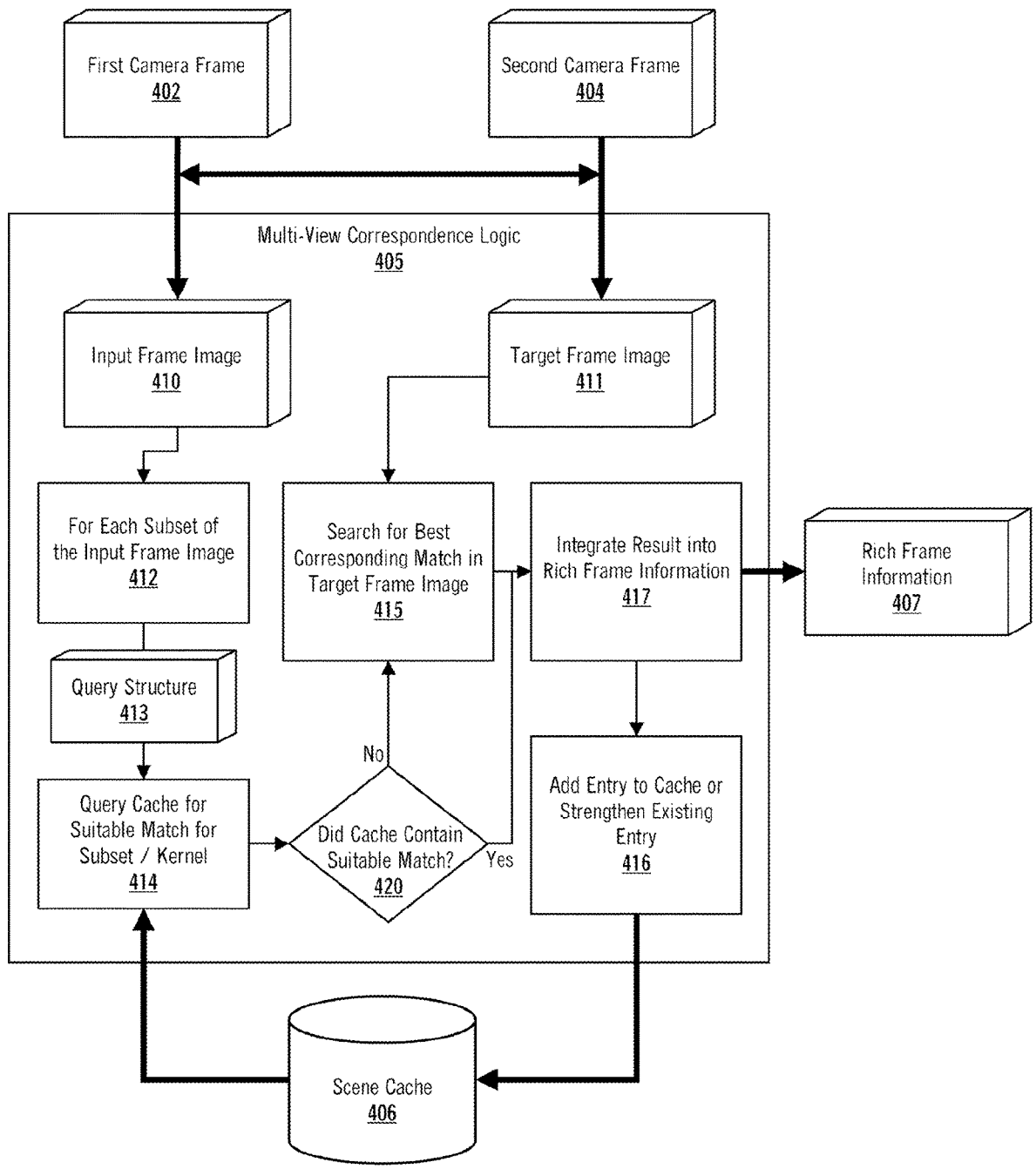
FIG. 5 is a schematic block diagram depicting an example of function of the system of FIG. 4, in the context of an exemplary behavior for multi-view correspondence logic.

FIG. 5 depicts the exemplary system of FIG. 4, but in the context of an exemplary behavior, in accordance with the invention, for multi-view correspondence logic. In the example of FIG. 5, multi-view correspondence logic 405 receives first camera frame 402 and second camera frame 404. The multi-view correspondence logic 405 is operable to select one frame as input data in step 410. Another frame that was not selected as the input frame may be considered as the target frame 411.

For each pixel, or subset of the input frame image, a query structure 413 is generated in step 412. A query structure can include or be constituted by an image kernel, or a small set of data that can identify the pixel or image subset in context. For example, the query structure may be a 3×3 grid of pixel values taken from the input frame image 110 surrounding the pixel or operational subset selected in step 412. Additional data may also be included in the query structure, depending on the particular practice or embodiment of the present invention.

In step 414, the scene cache 406 is accessed to retrieve the most suitable entry based on the criteria in query structure 413. Depending on the data present in the scene cache 406, there may or may not be a suitable entry found (see operation 420, "Did Cache Contain Suitable Match?"). If multiple entries are found, there can also be logic to select the most suitable entry among all the possible candidates.

If no entry is found in the scene cache 406, search logic in step 415 is operable to examine target frame image 411 to locate the best portion of the image corresponding to the pixel, subset of the input frame image, or query structure 413.

The resultant data, whether originating from a suitable query into scene cache 406, or resulting from search logic in step 415, may be integrated, via operation 417 "integrate result into rich frame information," into an output map 407 containing rich frame information. The output map may be a disparity map indicating the disparity between each pixel or portion of the input frame image 410 and the target frame image 411. Alternatively, the output map may be a depth map computed from that disparity information. In other possible embodiments, it may comprise three-dimensional (3-D) positions for scene objects, or it may comprise additional meta-data, which was captured from a camera or sensor, retrieved from a cache or scene data-store, or computed as a product of one of the operations discussed, or another operation. The additional meta-data may comprise depth information, color information, material information, lighting information, confidence information, timing information, or other kinds of information.

Finally, in step 416, the resultant data may be used to augment the information in scene cache 406. If the resultant data originated from the cache, the cache entry may be strengthened. If the resultant data was manufactured by the search logic in step 415, the resultant data may be used to create a new entry in the cache.

Entry Contents and Query Structures

In exemplary embodiments of the present invention, the cache facilitates lookup of an entry, comprising result data, using query data. In some instances the result data may be referred to as the payload, and in some instances the query data may be referred to as the tag.

In exemplary practices of the invention, the result data may comprise any of: disparity data, depth data, color data, material data, illumination data, three-dimensional (3D) position data, and/or additional data that can be used to reconstruct a scene.

In some embodiments, query data is a multi-field data structure.

In accordance with exemplary practices and embodiments of the present invention, a query structure comprises at least one datum, but may comprise more than one datum. Collectively, the query data can identify an entry, but the identification may not be precise. Entries in the cache contain data corresponding to the query structure, and an entry's suitability for a given query is the result of a comparison function that is evaluated between the query structure and the entry's data. In accordance with the present invention, the suitability function may perform complex evaluation logic to determine if, and to what degree, an entry is suitable for a given query. The evaluation logic may consider multiple data within the entry and the query structure.

In one embodiment of the invention, a query structure comprises a 3×3 kernel of pixel values representing a subset of an image. In other embodiments, a kernel of another size may be used, or alternate data may determine suitability.

In another embodiment of the invention, a query structure comprises a small collection of 3-D points, with positions that are expressed relative to one another, or relative to a common center point. For example, the query structure may include 16 three-dimensional (3-D) points in close spatial proximity within the scene. These points may correspond to a feature within the scene, such as, for example, the corner of a picture frame in the background of a scene. The feature may then be identifiable from different perspectives or viewpoints.

In exemplary practices of the invention, a query structure may further comprise two-dimensional (2-D) image-space coordinates to accelerate the search for the best entry in the scene cache. The two-dimensional coordinates may represent a pixel location within an image. In such an example, the two-dimensional image coordinates may restrict the query to the location specified. Alternately, the two-dimensional coordinate may suggest a starting point for a search within the cache, with the suitability of cache entries diminishing as they are sited further from the specified query location.

In some embodiments, the cache structure may utilize these two-dimensional coordinates to aid in its organization and entry retrieval. For example, some cache embodiments are based on a two-dimensional grid, with storage for a fixed number of entries in each grid location. The grid may map to pixels or blocks of pixels within an image.

In other embodiments, three-dimensional coordinates may be useful to organize the cache or to aid in query efficiency. In yet other embodiments, higher dimensional coordinates may be used, such as four-dimensional and higher values (n-dimensional). In other embodiments, spatial coordinates or hints are not required.

In some embodiments of the present invention, the entries in the cache or index to items in the cache may be arranged using space-filling curves or arrangements such as a Hillbert Curve or Morton Order. This allows entries with spatial proximity to be arranged near to one another, which may enhance the efficiency of a query process that examines spatially proximate entries. Space filling curves and arrangements usually have generalizations with arbitrary dimensionality. For example, the cache may be arranged in a 2-D Morton order if the entry coordinates correspond to image coordinates, and it may be arranged in a 3-D Morton order if the entry coordinates correspond to points in 3-D scene-space.

In some embodiments, a query structure may further comprise an image ID. The image ID may correspond to a specific camera among a set of cameras used in a multi-camera device. In such an embodiment, it may be beneficial to locate only entries associated with a given image or camera.

Cache entries may further comprise "strength" values or a hit counter. In some embodiments, these values may play a role in "cache curation" methods in accordance with the invention, examples of which are discussed in greater detail below, and may be used to track the usefulness or accuracy of a cache entry. In some embodiments, entries must exceed a threshold hit count or a threshold strength before they may be considered suitable.

In other embodiments, entries with a higher strength will be considered more suitable than entries with a lower strength. In some instances the relationship between strength and suitability is logarithmic, where initial corroboration is very important but becomes diminishingly less important as an entry has been sufficiently corroborated.

In some embodiments, an entry may comprise a confidence score. The confidence score may be the result of the kernel comparison function. In one exemplary practice of the present invention, the comparison function is evaluated to compare two image kernels from respective corresponding frames, prior to creation of the cache entry. When the cache entry is created, the comparison result, which may be referred to as the comparison error, is retained with the entry. This comparison result value can be considered a confidence score.

Entry Suitability Determination Criteria

In accordance with exemplary practices and embodiments of the present invention, many factors may potentially be considered when determining if an entry is a suitable result for a query. The query's image kernel or point position data may be foremost in the considerations, as well as the coordinate values from the query. Additional considerations may be used to increase or decrease the suitability of a given entry for a given query.

In one embodiment, a comparison function is evaluated to compare image kernels in the query structure and in the prospective entry. The comparison functions may comprise an absolute comparison, a comparison of average values across the kernel, a comparison of the square root of pixel values, and/or a pattern match in which pixel values are compared relative to other pixels within the kernel, as opposed to absolute pixel values. A sum of square differences function may also be used. The comparison function may also be a compound function, potentially comprising a combination of the above functions.

This comparison function may benefit from performing a separate comparison on the chrominance (chroma component) or color data from the image kernels. This approach provides greater robustness against global changes in lighting, over time, as might be caused by shifting clouds outside (for an outdoor scene) or other factors. In such an approach, separate thresholds, scales, or numerical transformations may be applied to comparisons of chrominance, or color data, from the thresholds, scales, or numerical transformations applied when comparing luminance, or light intensity data. In some embodiments, the comparison function relies much more heavily on chrominance data, and may rely on chrominance data exclusively.

In another embodiment, 3-D point comparisons may be performed. In such an implementation, the relative positions of the points is taken into consideration. The comparison may permit transformation on the points, such as rotation, translation, or scaling of the point positions.

In yet other embodiments, 3-D points may contain color or lighting data, in which case the comparison function may consider the point positions as well as the point color or lighting, or a combination of all of these properties.

In some embodiments, an entry's confidence value may be used to inform its suitability for a query. By way of example, when an entry is evaluated, a kernel stored with the entry may be compared against the kernel that is part of the query structure. The result of the comparison function can be interpreted in light of the stored confidence value and used to determine the suitability of the cache entry. If the comparison result is reasonably similar, it can be assumed that the entry is as suitable for the query as the original comparison from which the entry was created. If there is a large discrepancy, it may be indicative of substantial changes and therefore an unsuitable entry.

In some embodiments, a signature may be created for a kernel or for a collection of points, based on the salient features most important to the comparison function. In this case, kernels or point collections that would be compared most closely with each other would have the same or very nearby signatures. This signature may help quickly locate the most appropriate matching entries for a query, within the cache.

Cache Curation Methods

In accordance with the invention, "strength" may be a property or datum for entries in the cache. Strength may refer to the degree to which a cache entry represents valid scene data. In one embodiment, strength can be categorized into one of two bivalent states indicating whether an entry is a "stable" result or is a "candidate". In such an embodiment, entries begin as candidates, but are strengthened with successful matches against query kernels created from captured frames. Alternatively, matching other datums may also strengthen an entry. Once an entry's strength has surpassed a threshold, the entry would be considered stable, and thus the entry would be suitable for use as a valid result.

In one embodiment of the invention, data within the entry may be continuously modified in response to the degree of match between a cache entry's data and the data in the query structure. In some instances the results of this match function may be interpreted to trigger different behaviors. For example, a near match may prompt an averaging between data in the entry and data in the query structure, while a distant or poor match may prompt the creation of a new entry or the replacement of the unmatched entry altogether.

In some embodiments, data within the cache may be updated in a periodic fashion. In such embodiments, a subset of the data within the cache may be replaced with new data periodically. For example, all entries that contain image-space coordinates meeting a certain criteria may be replaced or updated in a given frame. The criteria may include coordinates that fall within a range of scan-lines, a region of the image, or some other pattern such as interleaved or interlaced collections of pixels. In subsequent frames, different subsets may be updated such that all entries in the cache are updated over a sequence of frames.

In other embodiments, a subset of entries in the cache may be invalidated in response to detected events. For example, motion detected in the scene may cause associated cache entries to be invalidated. Similarly, a high rate of unsuitable cache entries may cause related cache entries to be invalidated or removed.

In other embodiments, cache entries may be marked with a time stamp, frame number, or another indicator of "recency." In such an embodiment, successful query matches may refresh or advance an entry's recency indicator. Otherwise, entries may be invalidated once the associated recency indicator passes beyond a threshold age.

Depth and Layers for Entries Within the Cache

In some embodiments of the present invention, cache entries may have associated depth information. This depth information may be derived from disparity information. In some cases, multiple cache entries may exist with the same image-space coordinates but different depth or disparity values. These depth or disparity values may be classified into ranges, and the ranges may be referred to as depth levels or layers.

In an example embodiment, cache entries representing samples from the background may be classified into a background layer, while cache entries taken from a person sitting in front of a device (or its camera(s)) may be classified into a middle layer, while samples from the person's hands, captured while gesturing, may be classified into an extreme foreground layer.

In some embodiments, depth ranges may be pre-defined. As with the previous example, ranges may be based on common use-cases, such as a video conferencing session. In alternative implementations, layer assignment may be dynamic or fluid. In such an example, a first entry may be assigned to an arbitrary layer, then an adjacent entry may be assigned to the same layer or another layer above or behind the layer of the first entry, based on the relative difference in depth or disparity.

In some embodiments, a new entry may replace another entry within the same layer or within nearby layers, but will not affect an entry in a sufficiently distant layer. Alternatively, new entries may be permitted to exist within the same layer or within a proximate range of layers until one entry has attained a sufficient strength to replace another entry.

In an exemplary practice or embodiment of the present invention, entry depth may be indicated in relative terms, rather than absolute terms. In such an implementation, entries associated with an object may be indicated to be above, behind, or at the same approximate level as entries associated with adjacent objects or pixels. For example, entries representing samples from a foreground object may be indicated to be above adjacent entries associated with a background object. Similarly, entries associated with background objects may be indicated to be at the same level as entries associated with other background objects.

Re-Projection and Transformation of Locations of Cache Entries

Embodiments that make use of two-dimensional (2-D) image-space coordinates for accessing entries in the cache may experience a problem whereby many cache entries become invalid in the event of camera movement.

This problem can be partially solved by re-projection or warping of the two-dimensional coordinates associated with a cache entry, to compensate for camera movement. If an accurate spatial transformation for the camera, i.e., movement from the previous camera position and orientation, can be determined, many of the cache entries may be salvaged through a re-projection transform.

If the camera transformation comprises primarily rotation, or if the scene being observed is reasonably uniform in depth, then the re-projection operation is very straightforward, and will yield high quality results. If the camera position transformation involves large translation or if the scene depth varies significantly, the re-projection operation becomes more complex due to occlusion and dis-occlusion of portions of the scene.

Nonetheless, depth information will allow many of the cache entries to be accurately re-projected, leading to higher quality results than would otherwise occur immediately following camera movement.

In some cases, the camera transformation or tracking can be produced using additional sensors such as an accelerometer, gyroscope, or another camera or set of cameras. The transformation information may also be a result of different processes, such as SLAM, PTAM, DTAM, or other processes, interpreting data from the same camera or cameras.

In other embodiments, the camera transformation information can be a result of the information from a stereo disparity search on new frames captured from a camera. In such an embodiment, the initial accuracy of the camera transformation may be poor, immediately following the camera movement. Utilizing many data points, it may be possible to obtain an accurate camera transformation from the captured camera image. Then, this camera transformation could be used to re-project the cache entries, resulting in a higher quality output.

In another embodiment, motion estimation may be used to determine the motion of objects within the scene based on frames captured from one or more cameras. This motion may represent either object motion, camera motion or both. The motion may be expressed as three-dimensional vectors or two-dimensional vectors. The motion vectors that result from a motion estimation operation may be used to perform transformation operations to entries within the cache. Transformations may be applied to cache entries comprising two-dimensional coordinates as well as cache entries comprising three-dimensional coordinates.

These transformation operations may comprise shifting, translating, scaling, re-projecting, rotating, performing other transformations, or performing a combination of transformations. Transformations may be applied to all entries within the cache or to a subset of entries. In some cases, boundary functions, such as depth or disparity thresholds, or delta thresholds, may be used to determine which cache entries belong to which scene objects, and therefore which transformation operations may be applied to the respective cache entries.

Digital Processing Environment in Which Invention Can be Implemented

Those skilled in the art will understand that the above described embodiments, practices and examples of the invention can be implemented using known network, computer processor and telecommunications devices, in which the telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the present invention can be executed in commercially available digital processing systems, such as servers, PCs, laptop computers, tablet computers, cellphones, smartphones and other forms of mobile devices, as well as known forms of digital networks, including architectures comprising server, cloud, network, and client aspects, for communications between such devices.

The terms "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer-readable RAM or ROM element or any other known means of encoding, storing or providing digital information, whether local to or remote from the cellphone, smartphone, tablet computer, PC, laptop, computer-driven television, or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units, and including commercially available processing units, memory units, computers, servers, smartphones and other computing and telecommunications devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Visual Basic, Java, C++, and the like. It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

The Applicants have implemented aspects of the present invention, in prototype form. One implementation comprises a complete device, including four cameras, capable of encoding content and receiving (full-duplex communication). Another is an Apple iPhone-based implementation that can receive and present immersive content (receive-only). The Applicants used the following hardware and software structures and tools, among others, to create the two noted implementations, collectively:

1. A seven inch 1280×800 IPS LCD display.
2. Four PointGrey Chameleon3 (CM3-U3-13S2C-CS) 1.3 Megapixel camera modules with ⅓" sensor size assembled on an aluminum plate with shutter synchronization circuit.
3. Sunex DSL377A-650-F/2.8 M12 wide-angle lenses.
4. An Intel Core i7-6770HQ processor which includes on-chip the following:
    a. An Intel HD Graphics 580 Integrated Graphics Processing Unit; and
    b. An Intel QuickSync video encode and decode hardware pipeline.
5. OpenCL API using Intel Media SDK running on Linux operating system to implement, among other aspects: Image Rectification, Fast Dense Disparity Estimate(s) (FDDE) and Multi-level Disparity Histogram aspects.
6. OpenGL API running on Linux operating system to implement Multiple Native Disparity Map Voting and image reconstruction.
7. Intel Media SDK to access Intel QuickSync video compression hardware.
8. PhidgetSpatial 0/0/3 Basic accelerometer module and Linux API to determine device orientation.
9. DLIB Face Detection library to locate presence of viewer's face.
10. In addition, the Apple iOS SDK was used to access accelerometer, gyroscope and compass for device orientation and to access video decode hardware; and the OpenGL ES API to implement multiple native disparity map voting and image reconstruction to enable an iPhone-based prototype of a receiving device.

Flowcharts of Exemplary Practices of the Invention

FIGS. 6-10 are flowcharts illustrating method aspects and exemplary practices of the invention. The methods depicted in these flowcharts are examples only; the organization, groupings, order and number of operations in the exemplary practices can be varied; and the exemplary practices and methods can be grouped, arranged or ordered differently, and include different or additional functions, whether singly or in combination, while still being within the spirit and scope of the present invention.

Elements shown in the flowcharts in parentheses are, among other aspects, optional in a given practice of the invention.

All the text and respective textual elements of the accompanying flowcharts are incorporated by reference into this Detailed Description of the Invention as if set forth in their entireties in this Detailed Description of the Invention, in the respective order in which they appear in the flowcharts, while noting that the grouping, organization, order and number of operations in the exemplary practices can be varied; and the exemplary practices and methods can be arranged or ordered differently, and include different or additional functions.

It should be noted that the method aspects described herein and depicted in the accompanying drawing figures can be embodied in devices, systems or computer software/program code operable in accordance with such method aspects of the invention; and that to one skilled in the technology of digital processors and computer software/program code for digital image or signal processing, the teachings of the method aspects described herein are also teachings of the configuring of devices, systems or computer software/program code operable in accordance with such method aspects of the invention.

In particular, FIG. 6 depicts a method of determining correspondence between two viewpoints of a common scene, in accordance with exemplary practices of the invention, as follows:

600: Determining Correspondence:
601. Select a feature in a first frame, the first frame representing the scene from a first viewpoint;
602. For the selected feature:
    602.1 identify a suitable cache entry associated with the selected feature, the identifying comprising: querying a cache structure containing cache entries, to identify the suitable cache entry: and
    602.2 in the absence of a suitable cache entry. search for a corresponding feature. in a second frame, representing the scene from a second viewpoint, and create, based on a result of the search, an entry in a cache structure to store the respective correspondence.

FIG. 7 depicts additional/optional elements relating to determining correspondence between two viewpoints of a common scene, in accordance with exemplary practices of the invention, as follows:

700. Additional/Optional Elements Relating to Determining Correspondence:
(701. The feature comprises a kernel of pixel values);
(702. The kernel of pixel values comprises a chroma component);
(703. The identifying comprises: executing a comparison between pixel values);
(704. The identifying comprises: comparing the number of prior successful matches of pixel values);
(705. The identifying comprises accessing entries based on two-dimensional image-space coordinates);
(706. The cache structure comprises a fixed matrix of possible entries; and wherein two dimensions of the matrix have a size proportional to the pixel resolution of the first frame);
(707. Construct a third frame representing the scene from a third viewpoint).

FIG. 8 depicts a method of non-correspondence-based reconstruction of an image of a scene, based on an input of pixel values representative of an image of the scene captured by at least one camera having a view of the scene, in accordance with exemplary practices of the invention, as follows:

800: Non-Correspondence-Based Reconstruction of Image:
801. Receive an input from at least one camera having a view of the scene and operable to capture an image of the scene, the input comprising pixel values representative of the scene; and
802. Query a cache structure containing cache entries associated with the pixel values, to obtain suitable entries to enable execution, in the digital processing resource, of a selected method of non-correspondence-based image reconstruction, wherein the selected method of non-correspondence-based image reconstruction comprises active depth sensing, utilizing depth information provided by the camera having a view of the scene.

FIG. 9 depicts a method for producing rich frame information, representative of a scene, in accordance with exemplary practices of the invention, as follows:

900: Producing Rich Frame Information:
901. Receive, from each of at least two cameras, each camera having a view of a scene, a respective independent viewpoint of the scene, each viewpoint having pixels associated therewith;
902. Store, in a frame buffer memory, pixels captured by the cameras;
903. Store, in scene cache memory, scene information that persists across a plurality of frames;
904. Use multi-view correspondence logic, the logic comprising electronic and/or software elements, to:
    904.1 Select an image subset from frame buffer memory;
    904.2 Query the scene cache memory;
    904.3 Evaluate the suitability of an entry from the scene cache memory; and
    904.4 Update one or more entries in the scene cache memory.

FIG. 10 depicts optional aspects relating to producing rich frame information, in accordance with exemplary practices of the invention, as follows:

1000. Optional Aspects Relating to Producing Rich Frame Information:
(1001. The multi-view correspondence logic comprises digital processor-readable program code executable on a general-purpose computational device);
(1002. The multi-view correspondence logic comprises digital processor-readable program code executable on a programmable GPU, GPGPU or other processor);
(1003. The rich frame information comprises a depth map).

Block Diagram of Exemplary Embodiment(s) of the Invention

Figure 11:
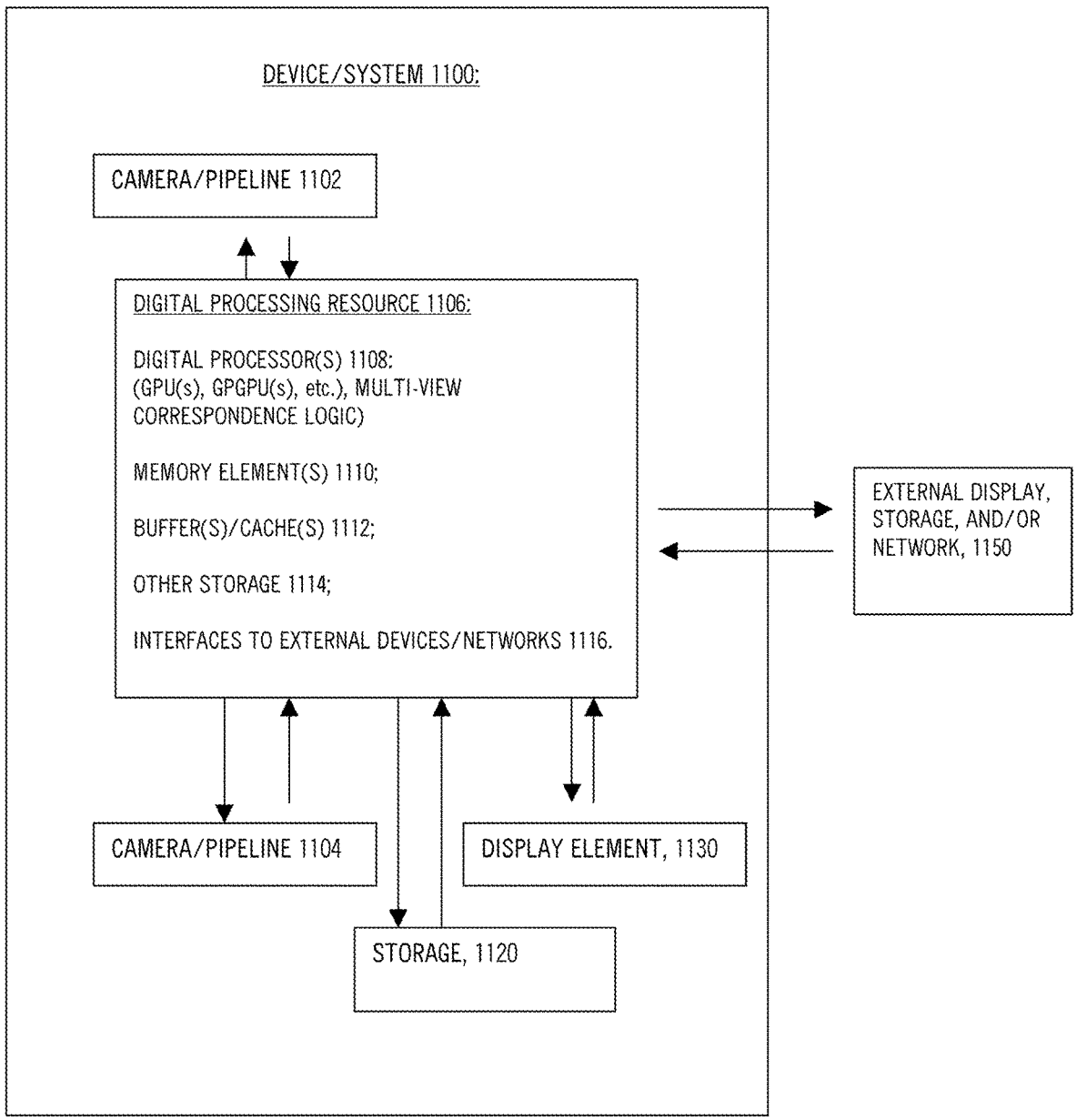
FIG. 11 is a schematic block diagram depicting exemplary structures in which the invention may be practiced or embodied.

FIG. 11 is a schematic block diagram depicting exemplary devices or systems in which aspects of the present invention may be practiced or embodied.

In particular, FIG. 11 is a schematic block diagram showing a device or system 1100 in which the invention may be practiced. The device or system 1100 may be implemented using known forms of digital processing hardware, such as known forms of smartphones, tablets and/or other forms of digital processing and imaging devices, supplemented as necessary in accordance with the teachings of the present invention. Arrows in FIG. 11 indicate exemplary flow of digital data and/or signals between elements.

By way of example, device or system 1100 can comprise at least a first digital camera or camera pipeline 1102, a second digital camera or camera pipeline 1104, and a digital processing resource 1106 comprising one or more digital processor(s) 1108, memory element(s) 1110, cache structure(s) and/or buffer(s) 1112, other storage 1114, and interfaces 1116 to external devices and/or networks. The cache structure(s) and/or buffer(s) 1112 can contain or provide the forms and functionalities of caches and buffers discussed elsewhere in this document in connection with the present invention, and/or depicted in the other accompanying drawing figures.

The digital processor(s) 1108 can include known forms of GPU(s), GPGPU(s) and/or other digital processors. The digital processing resource 1102 and/or the digital processor(s) 1106 can also include the multi-view correspondence logic discussed elsewhere in this document and depicted in the other accompanying drawing figures, enabling the functions and executing the operations discussed elsewhere in this document and depicted in the other accompanying drawings in connection with the multi-view correspondence logic and other aspects of the present invention.

In accordance with the teachings of the invention, such as discussed above, the digital processing resource 1106 is operable to receive digital data from the cameras or camera pipelines 1102, 1104, process the data in accordance with the invention, and provide outputs, based on such processing, to internal (i.e., within device or system 1100) display element 1130 or storage 1120; to other elements within the digital processing resource 1106; and/or to external display, storage or network elements (collectively 1150); or otherwise provide such outputs internally or externally for further processing.

The external display, storage or network elements 1150 may comprise the Internet; or cameras, sensors, storage devices, other devices, other processors, or other networks connected to or via the Internet, or other network-connected architectures, elements or destinations.

In addition, the digital processing resource may receive or consume digital information from such a network or networks 1150, such as for processing by the digital processing resource 1106.

It will be understood that a structure, device or system like that schematically depicted in FIG. 11 can contain all the elements of the invention depicted in the other drawing figures in this patent application and discussed herein.

FIG. 11, however, depicts merely an example of devices or systems in which aspects of the invention may be practiced or embodied. The invention may be practiced in connection with other forms of devices, systems or architectures, which may comprise more cameras, sensors or digital pipelines, more or different processing resources or configurations of processing resources, or in which the various elements, modules, components, functions and processing resources may be distributed across multiple structures, systems, devices or processors, or across networks.

CONCLUSION

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. A method for determining correspondence between two viewpoints of a common scene, the method comprising:
in at least one digital processing resource comprising at least one digital processor:
A. selecting a feature in a first frame, the first frame representing the scene from a first viewpoint; and
B. for the selected feature:
(1) identifying a suitable cache entry associated with the selected feature, the identifying comprising: querying a cache structure containing cache entries, to identify the suitable cache entry, wherein the cache structure comprises a persistent store to retain scene information, and the cache entries comprise information relating to correspondence; and
(2) in the absence of a suitable cache entry, searching for a corresponding feature, in a second frame, representing the scene from a second viewpoint, and creating, based on a result of the search, a cache entry in the cache structure to store the respective correspondence; and (3) utilizing information relating to correspondence from the identified suitable cache entry of (1), or information relating to correspondence from the created cache entry of (2), to determine correspondence between the two viewpoints of a common scene.

2. The method of claim 1 wherein the feature comprises a kernel of pixel values.

3. The method of claim 2 wherein the kernel of pixel values comprises a chroma component.

4. The method of claim 2 wherein the identifying comprises: executing a comparison between pixel values.

5. The method of claim 4 wherein the identifying further comprises: comparing the number of prior successful matches of pixel values.

6. The method of claim 2 wherein the identifying comprises accessing entries based on two-dimensional image-space coordinates.

7. The method of claim 6 wherein the cache structure comprises a fixed matrix of possible entries; and wherein two dimensions of the matrix have a size proportional to the pixel resolution of the first frame.

8. The method of claim 1 further comprising: constructing a third frame representing the scene from a third viewpoint.

9. The method of claim 1 further comprising:
utilizing, in the at least one digital processing resource, digital processor-readable program code executable on a general-purpose computational device.

10. The method of claim 1 further comprising:
utilizing, in the at least one digital processing resource, digital processor-readable program code executable on a programmable graphics processor unit (GPU).

11. The method of claim 1 further comprising: constructing a depth map.

12. The method of claim 1 further comprising: utilizing first and second cameras, wherein the first frame is captured by a first camera and the second frame is captured by a second camera.

13. The method of claim 1 further comprising: utilizing the cache structure to retain information from prior frames.

14. The method of claim 1 wherein identifying a suitable cache entry comprises evaluating a suitability function.

15. The method of claim 1 wherein identifying a suitable cache entry comprises utilizing a counter.

16. The method of claim 1 wherein identifying a suitable cache entry comprises utilizing a confidence score.

17. The method of claim 16 further comprising: executing a kernel comparison function; and wherein the confidence score is derived at least in part based on a kernel comparison function.

18. A system for determining correspondence between two viewpoints of a common scene, the system comprising: at least one digital processing resource comprising at least one digital processor, the at least one digital processing resource being operable to:

A. select a feature in a first frame, the first frame representing the scene from a first viewpoint; and B. for the selected feature:
(1) identify a suitable cache entry associated with the selected feature, the identifying comprising: querying a cache structure containing cache entries, to identify the suitable cache entry, wherein the cache structure comprises a persistent store to retain scene information, and the cache entries comprise information relating to correspondence; and (2) in the absence of a suitable cache entry, search for a corresponding feature, in a second frame, representing the scene from a second viewpoint, and create, based on a result of the search, a cache entry in the cache structure to store the respective correspondence; and (3) utilize information relating to correspondence from the identified suitable cache entry of (1), or information relating to correspondence from the created cache entry of (2), to determine correspondence between the two viewpoints of a common scene.

19. A program product for use with a digital processing system to enable the digital processing system to determine correspondence between two viewpoints of a common scene, the digital processing system comprising at least one digital processor, the program product comprising digital processor-executable program instructions stored on at least one non-transitory digital processor-readable medium, which when executed in the digital processing system cause the digital processing system to:

A. select a feature in a first frame, the first frame representing the scene from a first viewpoint; and B. for the selected feature:
(1) identify a suitable cache entry associated with the selected feature, the identifying comprising: querying a cache structure containing cache entries, to identify the suitable cache entry, wherein the cache structure comprises a persistent store to retain scene information, and the cache entries comprise information relating to correspondence; and (2) in the absence of a suitable cache entry, search for a corresponding feature, in a second frame, representing the scene from a second viewpoint, and create, based on a result of the search, a cache entry in the cache structure to store the respective correspondence; and (3) utilize information relating to correspondence from the identified suitable cache entry of (1), or information relating to correspondence from the created cache entry of (2), to determine correspondence between the two viewpoints of a common scene.

* * * * *